(12) United States Patent
McIntyre et al.

(10) Patent No.: US 9,045,661 B2
(45) Date of Patent: Jun. 2, 2015

(54) METHOD OF PREPARING CROSS-LINKED COLORANT DISPERSIONS

(75) Inventors: Patrick F. McIntyre, West Chester, PA (US); John C. Hornby, Newark, DE (US); Christian Jackson, Wilmington, DE (US); Xiaoqing Li, Newark, DE (US); James A. Silver, Kennett Square, PA (US); Tristan Williams, Cary, NC (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 440 days.

(21) Appl. No.: 13/510,015

(22) PCT Filed: Nov. 19, 2010

(86) PCT No.: PCT/US2010/057350
§ 371 (c)(1),
(2), (4) Date: May 16, 2012

(87) PCT Pub. No.: WO2011/063188
PCT Pub. Date: May 26, 2011

(65) Prior Publication Data
US 2012/0232195 A1 Sep. 13, 2012

Related U.S. Application Data

(60) Provisional application No. 61/263,635, filed on Nov. 23, 2009.

(51) Int. Cl.
| | |
|---|---|
| C09D 11/326 | (2014.01) |
| C08K 5/00 | (2006.01) |
| C08K 3/20 | (2006.01) |
| C09D 11/322 | (2014.01) |
| C09D 5/02 | (2006.01) |
| C09D 7/12 | (2006.01) |
| C09D 17/00 | (2006.01) |
| C08L 67/00 | (2006.01) |
| C09D 7/00 | (2006.01) |
| C08G 63/91 | (2006.01) |
| C08G 18/82 | (2006.01) |
| C08G 63/60 | (2006.01) |
| C08L 31/00 | (2006.01) |
| C08L 33/00 | (2006.01) |
| C08L 63/00 | (2006.01) |
| C08L 75/04 | (2006.01) |
| C09D 11/324 | (2014.01) |

(52) U.S. Cl.
CPC ............... *C09D 11/326* (2013.01); *C08K 5/00* (2013.01); *C08K 3/20* (2013.01); *C09D 11/322* (2013.01); *C09D 5/027* (2013.01); *C09D 7/125* (2013.01); *C09D 17/003* (2013.01); *C08L 67/00* (2013.01); *C08L 2312/00* (2013.01); *C09D 7/1225* (2013.01); *C09D 17/005* (2013.01); *C09D 7/007* (2013.01); *C08G 63/914* (2013.01); *C09D 5/028* (2013.01); *C08G 18/82* (2013.01); *C08G 63/60* (2013.01); *C08L 31/00* (2013.01); *C09D 17/001* (2013.01); *C08L 33/00* (2013.01); *C08L 63/00* (2013.01); *C09D 17/004* (2013.01); *C08L 75/04* (2013.01); *C09D 11/324* (2013.01)

(58) Field of Classification Search
CPC ...... C08G 63/60; C08G 63/914; C08G 18/82; C08K 3/20; C08K 5/00; C08L 31/00; C08L 33/00; C08L 63/00; C08L 67/00; C08L 75/04; C08L 2312/00; C09D 5/027; C09D 5/028; C09D 7/007; C09D 7/1225; C09D 7/125; C09D 11/322; C09D 11/324; C09D 11/326; C09D 17/001; C09D 17/003; C09D 17/004; C09D 17/005
USPC .......... 523/160, 161; 524/556, 591, 599, 839, 524/840
See application file for complete search history.

(56) References Cited

U.S. PATENT DOCUMENTS

| | | |
|---|---|---|
| 5,085,698 A | 2/1992 | Ma et al. |
| 5,231,131 A | 7/1993 | Chu et al. |
| 5,310,778 A | 5/1994 | Shor et al. |
| 5,852,075 A | 12/1998 | Held et al. |
| 6,117,921 A | 9/2000 | Ma et al. |
| 6,262,152 B1 | 7/2001 | Fryd et al. |
| 6,306,994 B1 | 10/2001 | Donald et al. |
| 6,433,117 B1 | 8/2002 | Ma et al. |
| 6,923,045 B2 | 8/2005 | Neo et al. |
| 8,591,020 B2 * | 11/2013 | Li et al. .................. 347/100 |
| 2003/0078320 A1 | 4/2003 | Yatake |
| 2005/0009977 A1 | 1/2005 | Azuma et al. |
| 2007/0299198 A1 | 12/2007 | Spinelli |
| 2008/0318009 A1 | 12/2008 | Berge et al. |

FOREIGN PATENT DOCUMENTS

| | | |
|---|---|---|
| EP | 556649 A1 | 6/1999 |
| JP | 09104834 A | 4/1997 |

OTHER PUBLICATIONS

Corresponding case PCT/US 10/57350, International Search Report, US Patent Office, Alexandria, VA, Authorized Lee W. Young, Jan. 18, 2011.

* cited by examiner

*Primary Examiner* — Patrick Niland
(74) *Attorney, Agent, or Firm* — Simon L. Xu; John H. Lamming

(57) ABSTRACT

A process for preparing a crossed-linked colorant dispersion is provided in which a partially neutralized dispersant polymer having a cross-linkable moiety is used as a dispersant for a colorant by reacting the cross-linkable moiety on the dispersant with a cross-linking agent.

20 Claims, No Drawings

METHOD OF PREPARING CROSS-LINKED COLORANT DISPERSIONS

This application claims priority under 35 U.S.C. §119 from U.S. Provisional Application Ser. No. 61/263,635, filed Nov. 23, 2009.

BACKGROUND OF THE INVENTION

This invention relates to a process of making crossed-linked dispersions, especially aqueous crossed-linked colorant dispersions.

Aqueous dispersions of pigments are widely used in ink-jet printing. Because a pigment is typically not soluble in an aqueous vehicle, it is often required to use a dispersing agent, such as a polymeric dispersant or a surfactant, to produce a stable dispersion of the pigment in the aqueous vehicle.

Conventional dispersants are adsorbed onto the surface of the particulate solid by physical interactions. Many conventional dispersants suffer from a disadvantage in that they may readily be displaced from the surface of the particulate solid by a more strongly adsorbing or displacing material resulting in destabilization of the dispersion and flocculation.

Various dispersion processes are known. A two-roll milling process of dispersing pigments using polymeric dispersants is disclosed in U.S. Pat. No. 5,310,778. A process where a combination of solvents is used and a polymeric dispersant is precipitated from the solvent mixture onto the finely dispersed pigment particles is disclosed in U.S. Pat. No. 6,923,045.

U.S. Patent Publication No. 20050609977 describes a process for preparing an encapsulated particulate solid dispersed in a liquid medium comprising cross-linking a dispersant with a cross-linking agent having at least two epoxy groups.

JP Laid Open Patent Publication 9-104834 describes a process for producing an aqueous pigment dispersion using a pigment and a resin by first treating the resin with an acidic compound to make the dispersion neutral or acidic, followed by neutralizing the carboxyl group of the resin using a basic compound.

A need exists for an easy-to-operate, more effective, and lower cost process for making stable colorant dispersions. The present invention satisfies this need by providing a process for making a cross-linked colorant dispersion by using a partially neutralized dispersant polymer to effectively adsorb the dispersant polymer onto pigment surface, and reducing the amount of the remaining un-adsorbed polymer so as to reduce or eliminate the interference of un-adsorbed polymer on the cross-linking of the dispersant polymer with a cross-linking agent.

SUMMARY OF THE INVENTION

An embodiment of the invention provides a process for making a cross-linked colorant dispersion comprising the steps of:

(a) dispersing a colorant in an aqueous vehicle with a partially neutralized dispersant polymer having a cross-linkable moiety, wherein said dispersant polymer is adsorbed to the colorant, and the remaining un-adsorbed dispersant polymer is less than 20% of the colorant concentration;

(b) reacting the cross-linkable moiety on the dispersant with a cross-linking agent; and (c) adjusting the pH of the aqueous vehicle to greater than 8.

Another embodiment provides that the process further comprises a step of purifying the dispersion by ultrafiltration after step (a) or step (c).

Another embodiment provides that the un-adsorbed dispersant polymer is less than 10% of the colorant concentration.

Another embodiment provides that the un-adsorbed dispersant polymer is less than 5% of the colorant concentration.

Another embodiment provides that the pH of the aqueous vehicle is adjusted to between 8 and 10.5 in step (c).

Another embodiment provides that the cross-linking agent is one or more members selected from the group consisting of epoxide, isocyanate, carbodiimide, N-methylol, oxazoline, silane, and mixtures thereof.

Another embodiment provides that the pH is between 8 and 10.5.

Another embodiment provides that the dispersant polymer is neutralized to 30%.

Another embodiment provides that the dispersant polymer is neutralized to 50%.

Another embodiment provides that the dispersant polymer is neutralized to 70%.

Another embodiment provides that the dispersant polymer is selected from the group consisting of polyurethane, polyvinyl and polyester.

Another embodiment provides that the dispersant polymer is polyurethane.

Another embodiment provides that the dispersant polymer is polyvinyl.

Another embodiment provides that the cross-linkable moiety on the dispersant polymer is one or more members selected from the group consisted of acid, hydroxyl, amino, and mixtures thereof.

Another embodiment provides that the cross-linkable moiety on the dispersant polymer is acid.

Another embodiment provides that the cross-linking agent is epoxide.

Another embodiment provides that the cross-linking agent is isocyanate.

Another embodiment provides that the mole ratio of the cross-linkable moiety on the dispersant polymer to the cross-linking agent is from 15:1 to 1:1.5.

Another embodiment provides that the mole ratio of the cross-linkable moiety on the dispersant polymer to the cross-linking agent is from 9:1 to 1:1.1.

Yet another embodiment provides that the mole ratio of the cross-linkable moiety on the dispersant polymer to the cross-linking agent is from 8:1 to 1:1.

These and other features and advantages of the present invention will be more readily understood by those of ordinary skill in the art from a reading of the following Detailed Description. Certain features of the invention which are, for clarity, described above and below as a separate embodiment, may also be provided in combination in a single embodiment. Conversely, various features of the invention that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the dispersions produced with the dispersant polymer described above can be utilized to disperse particles, especially pigments for ink-jet inks. These inks can be printed on all normally used ink-jet substrates including plain paper, photo paper, paper for network and commercial printing, and textile substrates.

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "dispersant" means a surface active agent added to a suspending medium to promote uniform and maximum separation of extremely fine solid particles often of colloidal size. For pigments, dispersants are most often polymeric dispersants.

As used herein, the term "P/D" means the ratio between a pigment and a dispersant.

As used herein, the term "aqueous vehicle" refers to water or a mixture of water and at least one water-soluble, or partially water-soluble (i.e. methyl ethyl ketone), organic solvent (co-solvent).

As used herein, the term "Mw" means weight average molecular weight.

As used herein, the term "Mn" means number average molecular weight.

As used herein, the term "degree of neutralization" means the mole percentage of acidic components on the dispersant polymer that is neutralized by a neutralizing agent.

As used herein, the term "D50" means the volume particle diameter of the 50th percentile (median) of the distribution of particle sizes.

As used herein, the term 'D95' means the volume particle diameter of the 95th percentile of the distribution of particle sizes.

As used herein, the term "cPs" means centipoise, a viscosity unit.

As used herein, the term "mN·m−1" means milliNewtons per meter, a surface tension unit.

As used herein, the term "mPa·s" means millipascal second, a viscosity unit.

As used herein, the term "AN" means acid number, mg KOH/gram of solid polymer.

As used herein, the term "DBTDL" means dibutyltin dilaurate.

As used herein, the term "DEA" means diethanolamine.

As used herein, the term "TBA" means tributyl amine.

As used herein, the term "DMPA" means dimethylol propionic acid.

As used herein, the term "TMXDI" means m-tetramethylene xylylene diisocyanate.

As used herein, the term "NMP" means n-Methyl pyrolidone.

As used herein, the term "IPDI" means isophorone diisocyanate.

As used herein, the term "TEB" means triethylene glycol monobutyl ether, a reagent supplied by Dow Chemical.

As used herein, the term "Sulfolane" means tetramethylene sulfone.

As used herein, the term "BzMA" means benzyl methacrylate.

As used herein, the term "BMA" means butyl methacrylate acid.

As used herein, the term "MAA" means methacrylate.

As used herein, the term "ETEGMA" means ethoxytriethylene glycol methacrylate.

As used herein, Eternacoll® UH-50 is a polycarbonate diol from UBE Industries, Tokyo, Japan.

As used herein, Denacol® 321 is trimethylolpropane polyglycidyl ether, a cross-linking reagent from Nagase Chemicals Ltd., Osaka, Japan.

As used herein, Nipex® 180 is a black pigment from Degussa, Germany.

As used herein, the term "PMMA" means polymethylmethacrylate.

As used herein, the term "GPC" means Gel Permeation Chromatography.

Unless otherwise noted, the above chemicals were obtained from Aldrich (Milwaukee, Wis.) or other similar suppliers of laboratory chemicals.

In addition, references in the singular may also include the plural (for example, "a" and "an" may refer to one of one or more) unless the context specifically states otherwise.

In one embodiment, the present invention provides a process for making a cross-linked colorant dispersion comprising the steps of:

(a) dispersing a colorant in an aqueous vehicle with a partially neutralized dispersant polymer having a cross-linkable, moiety, wherein said dispersant polymer is adsorbed to the colorant, and the remaining un-adsorbed dispersant polymer is less than 20% of the colorant concentration;

(b) reacting the cross-linkable moiety on the dispersant with a cross-linking agent; and (c) adjusting the pH to greater than 8.

The dispersant polymer in Step (a) is a random or structured polymer having cross-linkable moieties. Useful cross-linkable moieties are acid groups such as COOH and $SO_3H$, hydroxyl, mercapto, and amino groups. The dispersant polymer is usually comprised of both hydrophilic and hydrophobic monomers. Generally speaking the hydrophobic region is the part that contains the absorbing segment, which is the segment, or function of the dispersant, interacting with the pigment surface to effect dispersion. The hydrophilic region is the segment that stabilizes a dispersion by interaction with the aqueous vehicle. Furthermore, the dispersant polymer contains acid groups, and these acid groups are partially neutralized before the dispersant polymer is used to disperse a colorant. The purpose for this partial neutralization is to obtain an optimal balance of hydrophilicity and hydrophobicity for the dispersant polymer thus allowing it to be adsorbed onto the surface of the colorant while minimizing the level of un-adsorbed dispersant polymer. Typically, the degree of neutralization is from 30% to 90%, and more typically from 50% to 70%, depending on the acid number of the dispersant polymer. Often the higher the acid number of the dispersant polymer, the lower the degree of neutralization can be done without causing the dispersant polymer to be overly hydrophobic. More typically, the degree of neutralization is adjusted so as the remaining un-adsorbed dispersant polymer is less than 20% of the colorant concentration.

The neutralizing agent employed to accomplish the partial neutralization described above can be hydroxides of alkali metals, amines and the like. Examples of neutralizing agents organic bases such as mono-, di-, or tri-methylamine, morpholine, n-methyl morpholine, alcohol amines such as dimethylethanolamine (DMEA), aminomethylpropanol and methyldiethanolamine, pyridine, ammonium hydroxide, tetra-alkylammonium salts such as tetramethylammonium hydroxide, tetraethyl-ammonium hydroxide, and the like. Typically, the neutralizing agent is dimethylethanolamine or alkali metal hydroxides. Most typically, the neutralizing agent is potassium hydroxide.

The un-adsorbed dispersant polymer in the aqueous vehicle tends to interfere with the subsequent cross-linking step since the cross-linkable moieties on the un-adsorbed dispersant can also react with a cross-linking agent. It is therefore critical to reduce the amount of the un-adsorbed dispersant polymer from the aqueous vehicle. Typically, the amount of the un-adsorbed dispersant polymer in the aqueous vehicle is reduced to less than 20%, more typically to less than 10%, and most typically to less than 5% of the colorant concentration. The reduction in the amount of the un-adsorbed dispersant polymer is achieved by adjusting the degree of neutralization of the dispersant polymer. Optionally, certain solvent and impurities in the dispersion can be removed by ultrafiltration after step (a).

In step (b), the product of step (a) is reacted with a cross-linking agent. Identified in the table below are suitable cross-linkable functional groups that are in the dispersant polymer and the companion cross-linking groups that may be present in the cross-linking agent. The "Acid" referred to in the table below includes, but are not limited to, carboxylic acid and sulfonic acid.

| Cross-linkable Moieties | Cross-linking Groups |
|---|---|
| Acid | Epoxide, Carbodiimide, Oxazoline, N-Methyol |
| Hydroxyl | Epoxide, Silane, Isocyanate, N-Methyol |
| Amino | Epoxide, Carbodiimide, Oxazoline, N-Methyol |

Additional useful cross-linking agents are those which are soluble or insoluble in the aqueous vehicle, including m-tetramehylxylene diisocyanate (TMXDI), isophorone diisocyanate (IPDI), trimethylopropane polyglycidyl ether, polyglycerol polyglycidyl ether, oxazoline-functional polymers, waterborne polycarbodiimide resin, and silane.

The mole ratio of the cross-linkable moiety on the dispersant polymer to the cross-linking agent is from 15:1 to 1:1.5, typically from 9:1 to 1:1.1, and most typically from 8:1 to 1:1. In calculating the mole ratio, all cross-linkable moieties on the dispersant polymer and all cross-linking groups on the cross-linking agent are included.

In step (c), the pH is adjusted to greater than 8, and typically to between 8 and 10.5. Typically, the pH is adjusted by adding an aqueous solution of an alkali metal hydroxide, ammonia or tertiary amine to the dispersion. Step (c) can only take place after cross-linking takes place in step (b). Adjusting (increasing) the pH before step (b) would cause the dispersant polymer previously adsorbed on the surface of the pigment to become un-adsorbed due to the increase of hydrophilicity. The stability of the cross-linked dispersion is confirmed by the findings that the content of un-adsorbed dispersant polymer did not increase after the pH is adjusted to greater than 8.

Optionally, the dispersion is further purified by an ultrafiltration step after step (a) or step (c). The ultrafiltration can be carried out on any conventional cross flow, hollow fiber membrane. Typically, the membrane has a fiber with inner diameter greater than 0.75 mm, more typically greater than 1 mm. Suitable commercially available materials for constructing the membrane include polyethylene, polypropylene, polysulfone, polyvinylidene fluoride, and ceramic.

During the ultrafiltration process, excess solvents, undesirable impurities and un-adsorbed dispersant polymer in the aqueous vehicle are removed by discontinuous, or more typically, continuous diafiltration with de-ionized water. Often the dispersion is diluted to less than 5% pigment concentration, more typically to less than 3% pigment concentration with deionized water before diafiltration begins. After multiple-volume dilutions, the dispersion is concentrated to greater than 10% pigment.

Suitable dispersant polymer for the present invention includes polyurethane, acrylics, polyester and polyvinyl. Both random and structured polymers can be used. The term "structured polymer" refers to polymers having a block, branched or graft structure. Examples of structured polymers include AB or BAB block copolymers such as disclosed in U.S. Pat. No. 5,085,698; ABC block copolymers such as disclosed in EP-A-0556649; and graft polymers such as disclosed in U.S. Pat. No. 5,231,131. It should be noted that, in referring to the polymer compositions, a double slash indicates a separation between blocks and a single slash indicates a random copolymer. Thus, BzMA/MAA//BzMA 8//10//8 is an ABA triblock polymer with a first A block that is on average 8 BzMA (Benzyl Methacrylate) units long, a B block that is on average 10 MAA (Methaacrylic Acid) units long and a final example, the ones described in U.S. Pat. Nos. 5,085,698; 5,852,075; 6,117,921; 6,262,152; 6,306,994; and 6,433,117.

Colorants

A wide variety of organic and inorganic pigments, alone or in combination, may be dispersed with the dispersant polymer to prepare an ink, especially an ink-jet ink. The term "pigment" as used herein means an insoluble colorant that is required to be dispersed with a dispersant and processed under dispersive conditions in the presence of a dispersant. The colorant also includes dispersed dyes. The dispersion process results in a stable dispersed pigment. The pigment used with the inventive dispersant polymer does not include self-dispersed pigments. The pigment particles are sufficiently small to permit free flow of the ink through the ink-jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the pigment particle size should range from about 0.005 to about 5 micron, and most typically, from about 0.005 to about 1 micron. The average particle size as measured by dynamic light scattering is less than about 500 nm, typically less than about 300 nm.

The selected pigment(s) may be used in dry or wet form. For example, pigments are usually manufactured in aqueous media, and the resulting pigments are obtained as a water-wet presscake. In presscake form, the pigment does not agglomerate to the extent as in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigment from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 26; blue pigments from Pigment blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "C.I." designation for pigments established by Society of Dyers and Colourists, Bradford, Yorkshire, UK and published in *The Color Index*, Third Edition, 1971.

In the case of organic pigments, the ink may contain up to approximately 30%, typically from 0.1% to about 25%, and more specifically from 0.25% to 10% of pigment, by weight based on the total ink weight. If an organic pigment is selected, the ink will tend to contain higher percentages by weight of pigment than with comparable inks employing organic pigment, since inorganic pigments generally have higher densities than organic pigments.

The dispersant polymer is typically present in the range of from 0.1% to 20%, and more specifically from 0.2% to about 10%, by weight based on the weight of the total ink composition.

Preparation of Pigmented Dispersions

The pigmented dispersions used in this invention can be prepared using any conventional milling process known in the art. Most milling processes use a two-step process involving a first mixing step followed by a second grinding step. The first step comprises mixing of all the ingredients, that is, pigment, dispersants, liquid carriers, neutralizing agent, and any optional additives to provide a blended "premix". Typically all liquid ingredients are added first, followed by the neutralizing agent, then the dispersants, and lastly the pigment. Mixing is generally done in a stirred mixing vessel, and a high-speed disperser (HSD) is particularly suitable for the mixing step. A Cowels type blade attached to the HSD and operated at from 500 rpm to 4000 rpm, and more typically from 2000 to 3500 rpm, provides optimal shear to achieve the desired mixing. Adequate mixing is usually achieved after mixing under the conditions described above for a period of from 15 to 120 minutes.

The second step comprises grinding of the premix to produce a pigmented dispersion. Typically, grinding involves a media milling process, although other milling techniques can also be used. In the present invention, a lab-scale Eiger Minimill (Model M250, VSE EXP) manufactured by Eiger Machinery Inc., Chicago, Ill. is employed. Grinding was accomplished by charging about 820 grams of 0.5 YTZ® zirconia media to the mill. The mill disk is operated at a speed between 2000 rpm and 4000 rpm, and typically between 3000 to 3500 rpm. The dispersion is processed using a re-circulation grinding process with a typical flow rate through the mill at between 200 to 500 grams/minute, and more typically at 300 grams/minute. The milling may be done using a staged procedure in which a fraction of the solvent is held out of the grind and added after milling is completed. This is done to achieve optimal rheology that maximizes grinding efficiency. The amount of solvent held out during milling varies by dispersion, and is typically between 200 to 400 grams for a batch size with a total of 800 grams. Typically, the dispersions of the present invention are subjected to a total of 4 hours of milling.

For black dispersions, an alternate milling process using a Microfluidizer can be used. Microfluidization is a non-media milling process in which milling is done by pigment impingement through nozzles under high pressures. Typically, pigment dispersions are processed at 15,000 psi with a flow rate of 400 grams/minute for a total of 12 passes through the mill. In making the black dispersions in the Examples, a lab-scale (Model M-110Y, available from Microfluidics of Newton, Mass.) high pressure pneumatic Microfluidizer with a diamond Z Chamber was employed.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Preparation of Cross-Linked Pigment Dispersion

In the cross-linking step, a cross-linking compound is mixed with the pigmented dispersions prepared above at room temperature or elevated temperature for a period from 4 to 8 h. To facilitate the cross-linking reaction, it may be desirable to add a catalyst. Useful catalysts can be those that are either soluble or insoluble in the liquid and can be selected depending upon the cross-linking reactions. Some suitable catalysts include dibutyltin dilaurate (DBTDL), tributyl amine ("TBA") and dimethyldodecyl amine. After the cross-linking reaction is completed, the pH of the cross-linked dispersion can be adjusted to at least about 8.0, more typically to between 8.0 and 12.0, and most typically between 8.0 and 11.0, if needed. Optionally, the dispersion may be further processed using conventional filtration procedures known in the art. The dispersions may be processed using ultrafiltration techniques that remove co-solvents and other contaminants, ions or impurities from the dispersion. Each dispersion can be then tested for pH, conductivity, viscosity and particle size. Dispersion stability is deemed important to demonstrating the utility of the dispersant employed.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Ink Vehicle

The pigmented ink of this disclosure comprises an ink vehicle typically an aqueous ink vehicle, also known as an aqueous carrier medium, the aqueous dispersion and optionally other ingredients.

The ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thioglycol, Sulfolane, 2-pyrrolidone, 1,3-dimethyl-2-imidazolidinone and caprolactum; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimentyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are used on the total weight of the ink vehicle. A mixture of water and butyl carbitol is also an effective ink vehicle.

The amount of ink vehicle in the ink is typically in the range of from 70% to 99.8%, and more typically from 80% to 99.8%, by weight based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propel ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are $C_4$-$C_6$ alkanediols with 1,2-hexanediol being most typical. Suitable surfactants include ethoxylated acetylene diols (e.g. Surfynol® series commercially available from Air Products), ethoxylated alkyl primary alcohols (e.g. Neodol® series commercially available from Shell) and secondary alcohols (e.g. Tergitol® series commercially available from Union Carbide), sulfosuccinates (e.g. Aerosol® series commercially available from Cytec), organosilicones (e.g. Zonyl® series commercially available from DuPont).

The amount of glycol ether(s) and 1,2-alkanediol(s) added is typically in the range of from 1% to 15%, and more typically from 2% to 10% by weight, based on the total weight of the ink. Surfactants may be used, typically in the amount of from 0.01% to 5% and more typically from 0.2% to 2%, by weight based on the total weight of the ink.

Biocides may be used to inhibit growth of microorganisms.

Pigmented ink jet inks typically have a surface tension in the range of about 20 mN·m$^{-1}$ to about 70 mN·m$^{-1}$, at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not to clog to a significant extent in an ink jet apparatus. Further, the ink should not corrode parts of the ink jet printing device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even more advantageously, less than about 3.5 mPa·s.

The following examples illustrate the invention without, however, being limited thereto.

EXAMPLES

Standard laboratory techniques for handling water sensitive chemicals were employed for the following examples. For example, glassware was extensively dried before use, monomers were stored over molecular sieves, and cannulation procedures were used to keep material dry.

Gel Permeation Chromatography (GPC) was used to verify the predicted molecular weight and molecular weight distribution. The GPC system included a Waters 1515 Isocratic HPLC Pump, a Waters 2414 Refractive Index Detector, a Water Autosampler, and a Waters Column Heater set at 40° c. and containing 4 Sytregel columns (HR 0.5, HR 1, HR 2, and HR 4). Samples were eluted with tetrahydrofuran (THF) at a flow rate of 1 mL/min. The samples were analyzed using Breeze 3.30 Software with a calibration curve developed from polymethylmethacrylate (PMMA) standards with narrow molecular weight range. Based on light scattering data provided by Polymer Laboratories Ltd., the nominal, peak molecular weight for the PMMA standards were as follows: 300000, 150000, 60000, 30000, 13000, 6000, 2000, and 1000.

Particle Size Measurements

The particle size for the dispersions, pigments and the inks were determined by dynamic light scattering using a Microtrac® UPA 150 analyzer from Honeywell/Microtrac (Montgomeryville, Pa.)

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to derive the particle size distribution. Results are reported as D50 or D95.

Determination of Un-Adsorbed Polymer

To determine the un-adsorbed polymer in a dispersion, a sample of the dispersion is diluted with de-ionized water to the extent of having about 5% of colorant by weight. Typically, a 25 gram sample of this diluted dispersion is centrifuged at between 15,000 to 20,000 rpm for a period of 1-2 hours using a Beckman L-8 Ultracentrifuge. One skilled in the art can easily determine the optimal conditions for the centrifugation based on the properties of the dispersion. During centrifugation, the un-adsorbed dispersant polymer remains in the supernatant whereas the colorant, together with the adsorbed dispersant polymer on the colorant surface, deposits towards the bottom. After centrifugation, the supernatant is collected, and the amount of the un-adsorbed dispersant polymer in the supernatant is obtained by drying in an oven set at 150° C. for 3 hours, or until its weight becomes constant, to remove all volatiles. The percentage of un-adsorbed polymer is then calculated by dividing the weight of the un-adsorbed dispersant by the weight of the colorant in the diluted sample subjected to centrifugation. Alternatively, the un-adsorbed polymer can be determined by centrifuging a dispersion in a similar manner followed by performing an HPLC analysis on the supernatant solution. Calibration of the HPLC is done by using known concentrations of the dispersant polymer.

Dispersant 1 (Polyurethane, TMXDI-polycarbonate diol-DEA Terminated)

To a dry, alkali- and acid-free flask equipped with an additional funnel, a condenser and a stirrer, under a nitrogen atmosphere was added Eternacoll® UH-50 (269 g), DMPA (200 g), Sulfolane (526 g) and DBTL (0.08 g). The resulting mixture was heated to 60° C. and thoroughly mixed. To this mixture was added TMXDI (547 g) via the additional funnel followed by rinsing any residual TMXDI in the additional funnel into the flask with Sulfolane (15 g). The temperature for the reaction mixture was raised to 100° C. and maintained at 100° C. until the isocyanate content reached 1.2% or below. The temperature was then cooled to 60° C. and maintained at 60° C. while DEA (41.3 g) was added via the additional funnel mounted on the flask over a period of 5 minutes followed by rinsing the residual DEA in the additional funnel into the flask with Sulfolane (5 g). After holding the temperature for 1 hr at 60° C., aqueous KOH (1351.2 g, 3% by weight) was added over a period of 10 minutes via the additional funnel followed by de-ionized water (528 g). The mixture was maintained at 60° C. for 1 hr and cooled to room temperature to provide a polyurethane dispersant with 31.2% of solids and 15.5% of Sulfolane. This dispersant has a MN of 8195, MW of 15393, an acid number of 80, and a PD of 1.88.

Dispersant 2 (Acrylic, Diblock 8ETEGMA/30BzMA/11MAA)

To a dry 5 L flask equipped with an additional funnel, a thermocouple, a mechanical stirrer under a nitrogen atmosphere was added via cannulation THF (2777 g), followed by initiator 1,1-bis(trimethylsilyloxy)-2-methyl propene (120.9 g) and catalyst tetrabutyl ammonium m-chlorobenzoate (3.13 ml of a 1.0 M solution in acetonitrile). Additional quantity of the same catalyst (2.4 ml of a 1.0 M solution in acetonitrile and 10.9 g of THF) was added using a syringe pump during the feeding of monomers to the flask. Monomer Feed I contains trimethylsilyl methacrylate (906 g) and benzyl methacrylate, (2752.3 g), and was added over 60 minutes while the reaction exo-thermed to 65° C. After holding the reaction mixture at the same temperature for 1 h, HPLC indicated greater than 95% of monomer conversion. Monomer Feed II containing ethyl triethylene glycol methacrylate (1027.1 g) was then added over 15 minutes. The formation of the ETEGMA block in the acrylic polymer was found to progress to greater than 98% 90 min after the second feed ended. The resulting mixture was diluted with methanol (400.34 g). THF and other volatile by-products were distillated by slowly heating to 120° C. while adding 2-pyrrolidone at the same time. The final polymer solution contained 45.1% solids with a measured acid number of 85.2. This dispersant polymer has a Mn of 8543, Mw of 9568, and a PD of 1.12.

Dispersant 3 (Acrylic, Diblock 8ETEGMA/30BMA/11MAA)

Dispersant 3 was prepared using a procedure similar to that for the preparation of Dispersant 2 except that BMA instead of BzMA was used. The final polymer solution contained 45.1% solids with a measured acid number of 98.2. This dispersant polymer has a Mn of 9018, Mw of 9635, and PD of 1.07.

Preparation of Pigmented Dispersions

Pigmented dispersions were prepared using the three dispersants prepared above with magenta and black pigments. For the examples in Table 1, Table 2 and Table 7, PR122 (magenta) and Nipex 180 (black) were employed. Pigmented Dispersion 2A (and portions of 2A that were later used to prepare cross-linked pigment dispersions) was subjected to an ultrafiltration purification step.

The following procedure was used to prepare the magenta dispersions. Using an Eiger Minimill, a premix was prepared at typically 20-30% pigment loading and the targeted dispersant level was selected at a pigment/dispersant (P/D) ratio of 1.5-3.0. A P/D of 2.5 corresponds to a 40% dispersant level on pigment. Optionally, a co-solvent was added at 10% of the total dispersion formulation to facilitate pigment wetting and dissolution of dispersant in the premix stage and ease of grinding during milling stage. Although other similar co-solvents are suitable, triethylene glycol monobutyl ether (TEB as supplied from Dow Chemical) was the co-solvent of choice. Dispersant 1 was pre-neutralized with either KOH or amine to facilitate solubility and dissolution into water. During the premix stage, the pigment level was maintained at typically 27%, and was subsequently reduced to about 24% during the milling stage by the addition of de-ionized water for optimal media mill grinding conditions. After completion of the milling stage, which was typically 4 hours, the pigment levels in the dispersions were reduced to about 10 to 15% by dilution with de-ionized water.

For black dispersions, a process similar to the above was used except that a Microfluidizer was used for milling.

Preparation of Cross-Linked Pigment Dispersion:

In the cross-linking step, a cross-linking compound was mixed with Pigmented Dispersion 1A, 2A, 3A or 4A, and heated between 60° C. and 80° C. with efficient stirring for between 6 to 8 hours. After the cross-linking reaction was completed, the pH was adjusted to at least about 8.0 if needed. Cross-linked Pigment Dispersions 1B-1C, 2B-2C, 3C and 4B were prepared using the corresponding Pigmented Dispersions 1A, 2A, 3A and 4. Additional details including cross-linkable moieties, cross-linking agents, degree of neutralization, and percentage of un-adsorbed dispersant polymers for these dispersions are listed in Table 1.

TABLE 1

| Dispersion No. | Dispersant No. | Pigment | Pigment/Dispersant | Cross-linkable moiety | Cross-linking Agent | Cross-linking Agent/COOH | Degree of Neutralization (%) | Crossed-linking (%) | Un-Adsorbed Dispersant (%) |
|---|---|---|---|---|---|---|---|---|---|
| 1A (Comparative) | 1 | PR122 | 2 | COOH | — | — | 70 | — | 17 |
| 1B | 1 | PR122 | 2 | COOH | Denacol ® 321 | 1:5 | 70 | 20 | 17 |
| 1C | 1 | PR122 | 2 | COOH | Denacol ® 321 | 2:5 | 70 | 40 | 17 |
| 2A (Comparative) | 1 | PR122 | 3 | COOH | — | — | 60 | — | 3.1 |
| 2B | 1 | PR122 | 3 | COOH | Denacol ® 321 | 1:5 | 60 | 20 | 3.1 |
| 2C | 1 | PR122 | 3 | COOH | Denacol ® 321 | 2:5 | 60 | 40 | 3.1 |
| 3A (Comparative) | 2 | Nipex ® 180 | 4 | COOH | — | — | 80 | — | 9 |
| 3B | 2 | Nipex ® 180 | 4 | COOH | Denacol ® 321 | 1:5 | 80 | 20 | 9 |
| 4A (Comparative) | 2 | Nipex ® 180 | 3 | COOH | — | — | 50 | — | 2 |
| 4B | 2 | Nipex ® 180 | 3 | COOH | Denacol ® 321 | 1:5 | 50 | 20 | 2 |

Testing of Print Reliability

The dispersions were formulated into inks using a standard ink-jet ink vehicle targeting for a pigment concentration of 3%. Each ink was filled into an HP88 cartridge and printed using an HP K5400 printer (Hewlett-Packard Co.). The reliability test consisted of repeatedly printing a test image until all the ink in the cartridge was consumed. Typically, this takes about 160 pages. After every ten pages, a nozzle check pattern is printed and the number of nozzles in the print head not firing (missing) is counted. The print head has approximately 1,056 nozzles. The average number of missing nozzles is used as a measure of print reliability. In addition, a thin line is printed on each page, and the mean edge standard deviation of the line width is measured. This provides an indication on misdirected nozzles. The lower the value of the line width, the better the print reliability.

Example 1

Partially Neutralized Dispersants

As shown in table 2, black dispersions (BP-1 to BP-6) were prepared using black pigment Nipex® 180 and Dispersant 2, and magenta dispersions (MP-1 to MP-4) were preparing using PR122 and Dispersant 3. BP-1 and MP-1 are control dispersants with a Degree of Neutralization of 100%. The results showed that as the Degree of Neutralization decreases (e.g., from BP-1 to BP-6, or from MP-1 to MP-4), the percentage of un-adsorbed dispersant polymer also decreases. Furthermore, as the Degree of Neutralization decreases, a corresponding decrease in pH was observed. The measured particle sizes (D50 and D95) showed a slight upward trend as neutralization was progressively reduced. However, this change is well within limits for making good quality inks. The viscosity of all the dispersions were within an acceptable range for making good ink-jet inks.

TABLE 2

| Pigmented Dispersion | Dispersant No. | Degree of Neutralization (%) | Pigment (%) | P/D | pH | Viscosity (cps) | D50 (nm) | D95 (nm) | Un-Adsorbed Dispersant (%) |
|---|---|---|---|---|---|---|---|---|---|
| BP-1 (Control) | 2 | 100 | 12.04 | 2 | 9.38 | 3.92 | 110 | 180 | 25.5 |
| BP-2 | 2 | 80 | 11.84 | 2 | 8.64 | 3.82 | 102 | 177 | 21.5 |
| BP-3 | 2 | 60 | 14.94 | 2 | 8.29 | 6.78 | 106 | 177 | 16.5 |
| BP-4 | 2 | 50 | 14.69 | 2 | 8.19 | 7.12 | 105 | 171 | 13.5 |
| BP-5 | 2 | 40 | 15.06 | 2 | 7.95 | 7.59 | 113 | 179 | 7.5 |
| BP-6 | 2 | 35 | 12.69 | 2 | 7.78 | 4.22 | 109 | 218 | 1 |
| CP-1 (Control) | 3 | 100 | 10.47 | 2 | 9.81 | 4.32 | 84 | 165 | 39.5 |
| CP-2 | 3 | 70 | 11.73 | 2 | 8.22 | 3.6 | 86 | 162 | 30 |
| CP-3 | 3 | 45 | 13.12 | 2 | 7.89 | 5.18 | 100 | 193 | 21.5 |
| CP-4 | 3 | 30 | 13.16 | 2 | 7.64 | 5.05 | 115 | 213 | 7 |

Testing of Stability

Dispersion stability was tested by formulating each ink into an aggressive vehicle suitable for testing purpose consisting of 10% butyl cellusolve, 16% butyl carbitol and 5% 2-pyrrolidinone targeting for a pigment concentration of 3%. The particle size for the ink was measured, and the ink was placed in an oven set at 60° C. for 1 week before re-measurement of particle size. An increase in particle size is a result of pigment agglomeration and thus indicates poor long-term stability.

Example 2

Stability—Magenta Inks

Magenta Inks 1A-1C and 2A-2C were prepared using the corresponding dispersions 1A-1C and 2A-2C outlined in Table 1. The initial particle sizes are summarized in Table 3 below. The results showed that inks made with dispersions (1A and 2A) without any cross-linking had large particle sizes and were therefore unstable, whereas the inventive inks made with cross-linked pigment dispersions (1B, 1C, 2B and 2C) were stable as demonstrated by their small particle sizes.

TABLE 3

| | Ink | | | | | |
|---|---|---|---|---|---|---|
| | Ink 1A (Comparative) | Ink 1B | Ink 1C | Ink 2A (Comparative) | Ink 2B | Ink 2C |
| | Dispersion No. | | | | | |
| | Dispersion 1A | Dispersion 1B | Dispersion 1C | Dispersion 2A | Dispersion 2B | Dispersion 2C |
| Initial Particle Size (D50 nm) | 476 | 111 | 114 | 433 | 107 | 133 |

Example 3

Print Reliability—Magenta Inks

Inks 1D, 1E and 1F were made using the corresponding un-purified Dispersions 1A, 1B and 1C. Results summarized in Table 4 below indicated that Inks 1E and 1F made with the un-purified cross-linked pigment dispersions suffered from poor print reliability. However, Inks 2D, 2E and 2F made with the corresponding purified Dispersions 2A, 2B and 2C showed good print reliability.

TABLE 4

| | Ink | | | | | |
|---|---|---|---|---|---|---|
| | Ink 1D (Comparative) | Ink 1E | Ink 1F | Ink 2D (Comparative) | Ink 2E | Ink 2F |
| | Dispersion No. | | | | | |
| | Dispersion A | Dispersion 1B | Dispersion 1C | Dispersion 2A | Dispersion 2B | Dispersion 2C |
| Mean Line Width (um) | 41 | 22 | 136 | | | |
| Average Nozzle Outs (count) | 2 | 22 | 136 | 2 | 2 | 2 |

Example 4

Stability—Black Inks

Black inks 3A-3B and 4-4B were prepared using the corresponding dispersions 3A-3B and 4A-4B outlined in Table 1. The initial particle sizes as well as particle sizes after the aging test are summarized in Table 5 below. The results showed that inks made with dispersions (3A and 4A) without any cross-linking had large particle size increases after the aging test and therefore were unstable, whereas the inventive inks made with cross-linked pigment dispersions (3B and 4B) were stable as demonstrated by the small particle increases after the aging test.

TABLE 5

| | Ink | | | |
|---|---|---|---|---|
| | Ink 3A (Comparative) | Ink 3B | Ink 4A (Comparative) | Ink 4B |
| | Dispersion No. | | | |
| | Dispersion 3A | Dispersion 3B | Dispersion 4A | Dispersion 4B |
| Initial Particle Size (D50 nm) | 111 | 109 | 141 | 113 |
| Particle Size after Aging (D50 nm) | 446 | 110 | 665 | 150 |

Example 5

Print Reliability—Black Inks

As shown in Table 6 below, print reliability of Inks 3E and 4E made with the inventive cross-linked dispersions was better than the print reliability of the comparative Inks 3D and 4D.

TABLE 6

| | Ink | | | |
|---|---|---|---|---|
| | Ink 3D (Comparative) | Ink 3E | Ink 4D (Comparative) | Ink 4E |
| | | Dispersion No. | | |
| | Dispersion 3A | Dispersion 3B | Dispersion 4A | Dispersion 4B |
| Mean Line Width | 11 | 16 | 45 | 5 |
| Average Nozzle Outs | 8 | 5 | 26 | 2 |

Example 6

Purification of Pigmented Dispersion

Magenta Pigmented Dispersions 5A and 5B were prepared using a procedure similar to the ones for the preparation of Pigmented Dispersions 1A and 2A. Listed below in Table 7 are the ingredients used that resulted in Dispersion 5A with a Degree of Neutralization of 50%, and Dispersion 5B with a Degree of Neutralization of 70%. Both Dispersion 5A and 5B were subjected to an ultrafiltration using a spiral wound column followed by washing with de-ionized water to remove solvent, un-adsorbed dispersant polymer and any other impurities introduced with the pigment. The percentages of un-adsorbed dispersant polymer in the dispersions were measured before and after the purification. As shown in Table 7, the purification step reduced the content of the un-adsorbed dispersant polymer.

TABLE 7

| Ingredients | Dispersion 5A (50% Degree of Neutralization) | Dispersion 5B (70% Degree of Neutralization) |
|---|---|---|
| De-ionized Water* | 105.5 | 104.7 |
| Potassium hydroxide* (45% solids) | — | 0.86 |
| TEB* | 42.5 | 42.5 |
| Dispersant 1* | 81.5 | 81.5 |
| PR-122 (49% in water) | 195.5 | 195.5 |
| Properties | Dispersion 5A | Dispersion 5B |
| D50 (nm) | 114.4 | 108.2 |
| Un-Adsorbed Dispersant Polymer (%) | 4.9 | 8.7 |
| Un-Adsorbed Dispersant Polymer After Ultrafiltration (%) | 2.1 | 4.0 |

*Note: weight unit is gram.

What is claimed is:

1. A process for making a cross-linked colorant dispersion comprising the steps of:
   (a) dispersing a colorant in an aqueous vehicle with a partially neutralized dispersant polymer having a cross-linkable moiety, wherein said dispersant polymer is adsorbed to the colorant, and the percentage of the remaining un-adsorbed dispersant polymer is less than 20% of the colorant by weight based on the total weight of the colorant;
   (b) reacting the cross-linkable moiety on the dispersant with a cross-linking agent; and
   (c) adjusting the pH of the aqueous vehicle to greater than 8.

2. The process of claim 1, further comprises a step of purifying the dispersion by ultrafiltration after step (a) or step (c).

3. The process of claim 1, wherein the percentage of the un-adsorbed dispersant polymer is less than 10% of the colorant by weight based on the total weight of the colorant.

4. The process of claim 1, wherein the percentage of the un-adsorbed dispersant polymer is less than 5% of the colorant by weight based on the total weight of the colorant.

5. The process of claim 4, wherein the pH of the aqueous vehicle is adjusted to between 8 and 10.5 in step (c).

6. The process of claim 1, wherein the cross-linking agent is one or more members selected from the group consisting of epoxide, isocyanate, carbodiimide, N-methylol, oxazoline, silane, and mixtures thereof.

7. The process of claim 6, wherein the pH is between 8 and 10.5.

8. The process of claim 1, wherein the dispersant polymer is neutralized to 30%.

9. The process of claim 1, wherein tyre dispersant polymer is neutralized to 50%.

10. The process of claim 1, wherein the dispersant polymer is neutralized to 70%.

11. The process of claim 1, wherein the dispersant polymer is selected from the group consisting of polyurethane, polyvinyl and polyester.

12. The process of claim 11, wherein the dispersant polymer is polyurethane.

13. The process of claim 11, wherein the dispersant polymer is polyvinyl.

14. The process of claim 1, wherein the cross-linkable moiety on the dispersant polymer is one or more members selected from the group consisting of acid, hydroxyl, amino, and mixtures thereof.

15. The process of claim 4, wherein the cross-linkable moiety on the dispersant polymer is acid.

16. The process of claim 15, wherein the cross-linking agent is epoxide.

17. The process of claim 15, wherein the cross-linking agent isocyanate.

18. The process of claim 1, wherein the mole ratio of the cross-linkable moiety on the dispersant polymer to the cross-linking agent is from 15:1 to 1:1.5.

19. The process of claim 18, wherein the mole ratio of the cross-linkable moiety on the dispersant polymer to the cross-linking agent is from 9:1 to 1:1.1.

20. The process of claim 19, wherein the mole ratio of the cross-linkable moiety on the dispersant polymer to the cross-linking agent is from 8:1 to 1:1.

* * * * *